Aug. 13, 1935.   E. J. LAUTERBUR   2,011,494
DOUGH MIXER
Filed June 4, 1934

INVENTOR.
EDWARD J. LAUTERBUR
BY Allen & Allen
ATTORNEYS.

Patented Aug. 13, 1935

2,011,494

UNITED STATES PATENT OFFICE 2,011,494

DOUGH MIXER

Edward J. Lauterbur, Sidney, Ohio

Application June 4, 1934, Serial No. 728,967

20 Claims. (Cl. 259—109)

My invention relates to dough mixers of the type in which there is a bowl with an agitator therein for mixing the dough, and which bowl is tiltable, usually on the axis of rotation of the agitator, to discharge the completed mix; and in which suitable braking means is provided in the bowl along the path of action of the agitator, to retard the dough materials and thereby attain a thorough action of the agitator thereon. There are different kinds of lids in use; some are attached to the bowl and swing with it; others the merely stationary kind from under which the bowl slides.

In certain respects my present invention is similar to that disclosed and claimed in my copending application, Serial No. 715,653, filed March 15, 1934. The present invention differs from my above mentioned prior invention in that I utilize means that forms virtually the upper part of the rear wall of the mixing bowl as a braking member, as is claimed more broadly in application Serial No. 553,916, filed July 30, 1931, and also as a means for shifting the cover of the bowl backward and upward; this operation serving to bring the braking member structure up and out of the path of the adjacent portion of the main back wall of the bowl, for tilting the bowl forward to dump the contents, and the shifting of the cover also serving to afford an inlet opening at the front of the top of the bowl. The cover preferably is provided with an inlet opening through which flour and other ingredients may be introduced to the bowl; but this shifting of the cover, if the cover is provided with such inlet opening, affords an additional inlet opening at the front, as above described which is found desirable in certain installations. I also provide means comprised in the upper rear structure above mentioned whereby this structure, as a braking device is adjustable closer to or farther from the path of rotation of the agitator members, while maintaining closure at this rear upper part of the bowl; this adjustment being desirable to meet different conditions involved in the mixing of different kinds of doughs. This braking device afforded by my present invention is, in the respect that it affords an extended surface, avoiding the difficulty of the dough wrapping around the heretofore usual round braking bar and tearing of the dough, similar to my invention disclosed and claimed in the copending application of myself and Frank X. Lauterbur, Serial No. 553,916, filed July 30, 1931.

Objects other than those above alluded to will appear in the course of the following description illustrated by the accompanying drawing in which—

Figure 1:
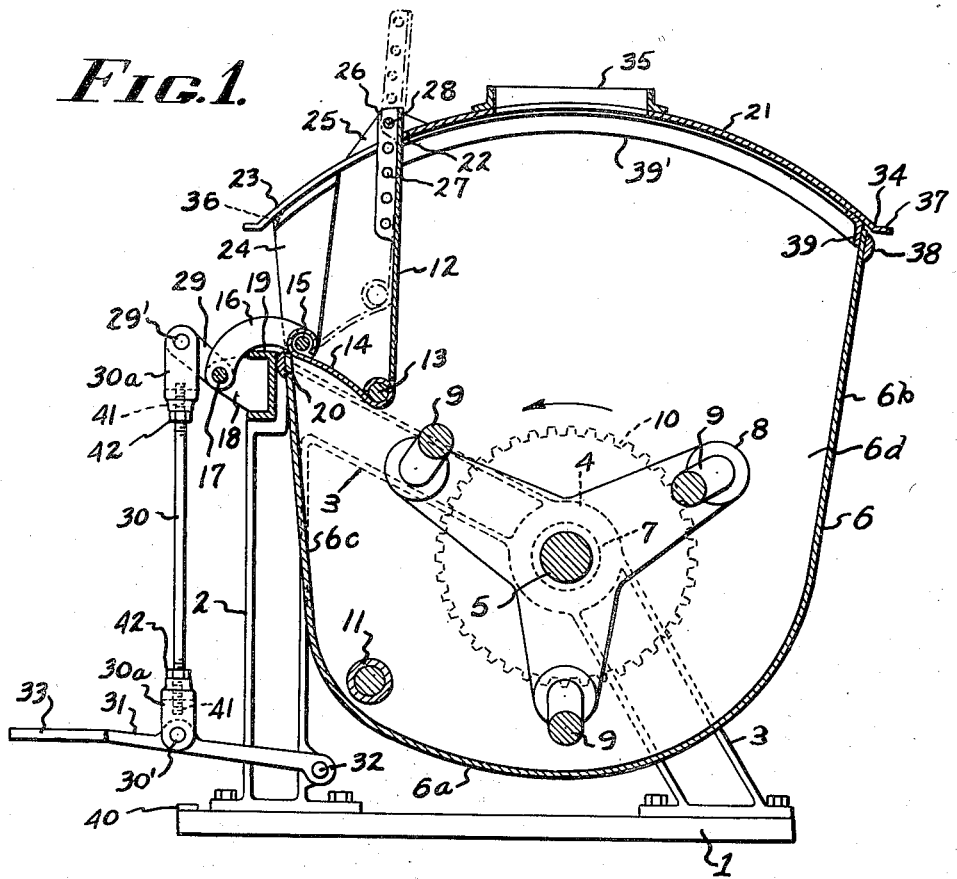
Figure 1 is a vertical front-to-rear section of a dough mixer embodying my invention, ready for operation.

As here disclosed the apparatus comprises a base 1, from opposite side portions of which side frames extend upwardly, each comprising a rear column 2, and a member 3, extending from the top of column 2 forwardly and downwardly. This member 3 has near its middle the bearing 4 for the respective part of the transverse agitator shaft 5, which extends from one side frame to the other. The bowl 6 is of the general shape familiar in the art, in that it is of U-shape in front-to-rear section; the bottom 6a being rounded, and the front and rear walls 6b and 6c diverging upwardly from the rounded or curved bottom 6a. It will be understood that the side walls 6d of the bowl are parallel and straight as is common in the construction of dough mixing bowls. Fixed to these sides 6d and extending outwardly therefrom are hollow trunnions 7 embracing the shaft 5 and bearing in the bearing parts 4 of the side frames; thus mounting the bowl 6 to be tilted forwardly for dumping the mixed contents. The agitator comprises side members each made up of radial arms 8 supporting transverse bars 9, as is usual in mixers of this type. The shaft 7 will be understood to extend out past its bearing 4 at one side and to have fixed on it a spur gear 10, with which it will be understood that any suitable gearing connection may mesh for driving the agitator. Also as is found in mixers of this type there is a lower rear braking bar or roller 11 extending from one side 6d to the other of the bowl slightly above the bottom 6a, and serving to retard the dough carried around by the agitator bars 9 and thus compel a thorough working of the dough. The rotation of the agitator is in the direction of the arrow, over toward the back of the bowl.

It has been usual to provide an additional braking bar similar to the lower braking bar 11, up to one side of the agitator; and where this bar has been simply round like the bar 11, tearing of the dough has resulted from the extreme outer portions of the dough, which protrude under the action of centrifugal force, wrapping around such a simple braking bar. In the copending application, Serial No. 553,916, this has been provided against by forming this upper braking means with an extended area beyond which the dough can not protrude under the action just mentioned; thus obviating this difficulty. In said prior application provision also has been made adjusting this extended braking member relative to the path of the agitator bars 9.

In my present invention I provide braking means of similar character; but which is formed by an articulated structure which is an upward extension of the back wall 6c of the bowl.

As here shown this structure comprises an upright plate 12, the lower end of which is curled around a pivot bar 13, with spaces in the curled around end to admit similar end parts of a lower rearwardly extending plate 14; so that these two plates 12 and 14 are articulated or hinged together by the pivot 13. The rear end of the lower plate 14 curls around a rear pivot rod 15, which is mounted in and extends transversely from one to the other of two curved arms 16, which have their opposite ends fixed on a transverse shaft 17. This shaft 17 is journaled near its ends in brackets 18 fixed to and extending back from a channel bar 19, having its ends fixed to the tops of the rear frame columns 2. The arms 16 are curved to extend over this bar 19 and permit the rear end part of lower plate 14 to seat close to the upper edge of the main back wall 6c of the bowl, which wall 6c terminates even with the top of the bar 19 and has a reinforcing rib 20 that engages the front side of the bar 19 when the bowl 6 is in operating position; thus limiting the backward tilting of the bowl.

This termination of the back wall 6c leaves the adjacent portions of the bowl side walls 6d extending considerably above the back walls 6c. The cover 21, which is curved with its concave side downward, and, when the apparatus is closed, fits snugly to the correspondingly curved upper edges of the side walls 6d, has its rear edge 22 terminated at the plate 12, leaving only lateral extensions 23 on which are fixed depending arms 24, the lower ends of which embrace the respective end portions of the pivot rod 15 that connects the lower plate 14 to the arms 16. These cover portions 23, near their junctions with their main part of the cover 21, have upstanding lugs 25; and the upright plate 12 has flanges 26 along the upper portions of its lateral edges, next to the respective bowl side walls 6d; these flanges extending backward, and each having holes 27 through it at intervals of its length. The lugs 25 have holes with which any one of the plate holes 27 may register; the registering holes receiving pins 28. Thus the plate 12 may be mounted at any one of several elevations, swinging the lower plate 14 with it. The highest one of these positions is indicated by the dotted lines in Fig. 1.

Figure 2:
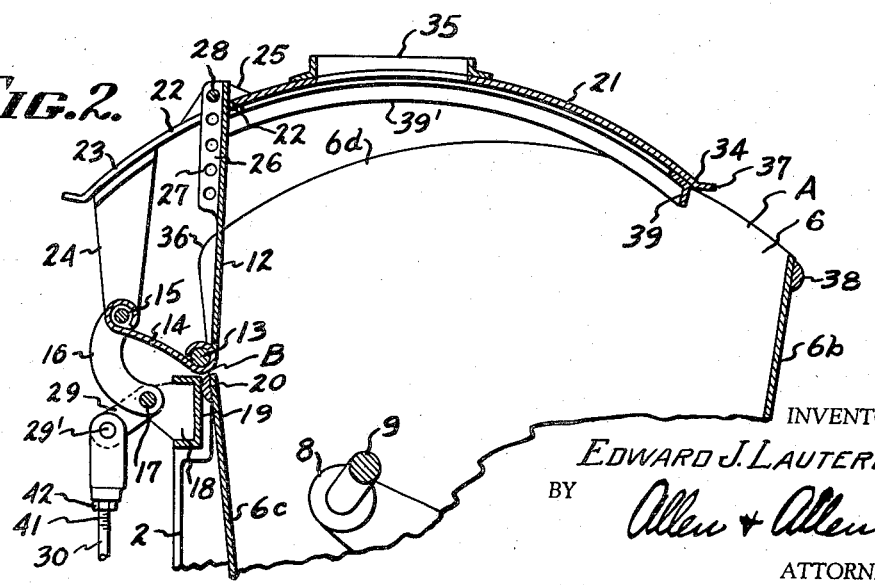
Figure 2 is a similar section of the upper part only of the apparatus, showing the positions of the parts when the cover is opened and the bowl is ready for tilting.

An arm 29 is fixed to one end part of the shaft 17 that carries the curved arm 16; and to the outer end part of this arm 29 is pivoted at 29' the upper end of a link 30a the lower end of which is pivoted at 30' to the middle part of a lever 31, the inner end of which has a fulcrum 32 on the lower part of the adjacent side frame column 2, and the outer end of which has a portion 33 to be engaged by the operator for depressing the lever 31. This depression of the lever operates to bring the parts to the position shown in Fig. 2. The curved arms 16 swing upward and backward, acting through the depending arms 24 of the cover 21 to raise the rear end of the cover away from the bowl, and also drag the cover back along the top edges of the bowl sides 6d with the front corner portions 34 slidably bearing on these edges. This leaves the space A open at the front of the bowl, permitting inspection of the contents or, if desired, insertion of ingredients. At the same time lower plate 14, following the arms 16 by its pivotal connection 15, swings the upright plate 12 backward, with this plate 12 pivoting on its pins 28 in the cover lugs 25. As the cover 21 also has moved backward almost as much as the lower plate 14, the upright plate 12 is still very close to a vertical position; and its lower end is up over and out of the way of the upper edge of the main back wall 6d of the bowl. Thus the bowl may be freely tilted forwardly for dumping. The cover 21 is shown with the inlet neck 35, which it will be understood may be suitably connected to a source of supply of flour or other ingredients in a manner usual in the art. Since the cover 21 is movable, some kind of flexible or otherwise movable connection from the neck 35 to the sifter or other stationary supply apparatus may be provided. However as this is not an essential part of my present invention, no more extensive disclosure of this is believed necessary herein.

When the bowl 6 is tilted to its complete dumping position, which is about 90 degrees from the operating position shown, the rear corners 36 of its side walls 6d will have passed out from under the cover portion 34 which was dragging on the wall edges. The cover 21 now is supported approximately in its raised position by the pivotally connected portions of the plates 12 and 14 bearing on the top of the transverse channel bar 19 as seen at B in Fig. 2; the cover 21 bearing down through the upright plate 12 and pulling up through the series of connections formed by arms 29 and 16 with the brackets 18 on said channel bar 19. The cover 21 may sag slightly at the front; but extending forwardly from its front bearing portions 34 are upwardly slanted cam portions 37, which will be engaged by downwardly slanted cam portions formed at the rear corners 36 of the bowl side walls 16. The cover 21 thus will be raised and the bowl walls 6d will again slide under it as the bowl returns to upright operating position. The top rim of the front bowl wall 6b is reinforced outside by a bar 38, and the cover 21 has dependent transverse and side flanges 39 and 39', back against which this rim closely fits when the cover and bowl come together in closed relation for operation of the mixer.

It will be understood that the lever 31 is suitably stopped by engagement with a projection 40 on the base 1; and so that the parts 12 and 14 and their connections will stop at the proper place against the bar 19, the link 30 is made with its middle portion adjustable relative to its end portions 30a by means of the threaded connections 41 and lock nuts 42.

It will be seen that at any time adjustment of the braking means relative to the agitator is permitted by means of the pin connections 28 on the upright plate 12. Also this plate 12 has ample extent away from the agitator to avoid the wrapping and tearing of dough as before explained. At the same time this braking means is effectively withdrawn for tilting of the bowl, and then supports the cover while the bowl is tilted. When the structure is in braking position the plates 12 and 14 closely fit against and extend one from the other of the bowl side walls 6d, forming a complete closure at the upper rear of the bowl, and thus forming virtually a part of the back wall of the bowl.

I have illustrated and described my invention in a preferred form, rather specifically, as is required; however I do not wish to be understood as being limited to such precise disclosure since modification may occur in practice. Therefore, what I claim as new and desire to secure by Letters Patent is:

1. A dough mixer comprising a tiltable bowl, an agitator therein, and a brake structure normally extending into said bowl adjacent to the agitator, and interposed in the path of a tilting part of the bowl and withdrawable relatively to the bowl out of the space in which it would be engaged by said tilting part of the bowl.

2. A dough mixer comprising a tiltable bowl, an agitator therein, and a brake structure normally extending into said bowl adjacent to the agitator, in the path of a tilting part of the bowl and withdrawable out of the way of said tilting part of the bowl, a cover for said bowl, and means connecting said cover to said braking structure whereby said cover is moved from a position closing the bowl to a position opening the bowl when said braking structure is withdrawn.

3. A dough mixer comprising a tiltable bowl, an agitator therein, and a brake structure normally extended into said bowl adjacent to the agitator, in the path of a tilting part of the bowl and withdrawable out of the way of said tilting part of the bowl, a cover for said bowl, and means for connecting said braking structure to said cover in various positions of the braking structure in which the effective braking part of such structure is at a greater or less distance from the agitator.

4. A dough mixer comprising a tiltable bowl, an agitator therein, a cover for said bowl, and a braking structure made up of an element depending from and swingingly connected to said cover, a second element pivoted to the lower part of the first mentioned element and in bowl closing relation to a wall portion of the bowl when the structure is in normal braking position, said elements when said structure is in said position making bowl closing contact with other wall portions of the bowl, whereby said structure in said position virtually forms part of a wall of the bowl, operating means, and a connection from said operating means to said second element to swing said structure on said cover out of the way of the first mentioned bowl wall portion, for tilting the bowl.

5. A dough mixer as set forth in claim 4, in which the connection between the element first mentioned therein and the cover is adjustable to project said first mentioned element more or less closely to the agitator, the adjusting movement being permitted by the pivotal connection of the two elements without moving the operating means.

6. A dough mixer as set forth in claim 4, in which the cover has an extension connected to the second mentioned element and to the operating means, said operating means having a movement whereby it acts through said cover extension to withdraw the cover from a position closing the bowl to a position opening the bowl when said braking structure is swung out of the way of the bowl wall portion.

7. A dough mixer as set forth in claim 1, comprising a support adjacent an exterior surface of the bowl, a shaft rotatable on said support, means for rotating said shaft, an arm fixed on said shaft and connected to said brake structure for withdrawing said structure upon rotation of said shaft, a cover for the bowl slidable thereon to open or close the bowl, and a connection from the cover to said arm whereby said cover is moved to opening position by the rotation of said shaft that withdraws the braking structure.

8. A dough mixer comprising a bowl and cover, said bowl being tiltable forwardly from a position under said cover, an agitator in said bowl, said bowl having front and side wall structures with which the cover makes closing contact when the bowl is in said position, and having a partial rear wall structure lower than the aforesaid wall structures, and braking means connected to the cover, movable into braking relation with said agitator, whereupon it completes said rear wall structure and is in the path which said partial rear wall structure would follow when the bowl is tilted, said means being capable of movement out of said braking relation and path, for tilting of the bowl.

9. A dough mixer as set forth in claim 8, in which the braking means is adjustable toward and from the agitator independent of the movement specified therein.

10. A dough mixer as set forth in claim 8, in which the cover is connected to said braking means to be moved back from the front of the bowl when said braking means has the movement specified therein.

11. A dough mixer comprising a bowl tiltable into and out of mixing position and an agitator in said bowl, a part of a side wall of the bowl being projected into the bowl to act as a braking means relative to said agitator, and being movable, while the bowl is in mixing position and while said part is continuing to function as a part of said wall, toward and from said agitator.

12. A dough mixer comprising a bowl and an agitator in said bowl, a part of a side wall of the bowl being projected into the bowl to act as a braking means relative to said agitator, and being movable, while continuing to function as a part of said wall, toward and from said agitator, a cover for said bowl, and mutually engaging means on the cover and said movable part of said wall, to hold said part of said wall in various braking positions to which it may be moved.

13. A dough mixer comprising a bowl and an agitator in said bowl, a part of a wall of the bowl being projected into the bowl to act as a braking means relative to said agitator, and being movable, while continuing to function as a part of said wall, toward and from said agitator, a cover for said bowl, and means for moving said cover from a position closing the bowl to a position opening the bowl, having a connection to said movable part of said wall, to move said part out of braking position when the cover is moved to opening position.

14. A dough mixer comprising a bowl and an agitator in said bowl, a part of a wall of the bowl being projected into the bowl to act as a braking means relative to said agitator, and being movable, while continuing to function as a part of said wall, toward and from said agitator, a cover for said bowl, and means for moving said cover from a position closing the bowl to a position opening the bowl, having a connection to said movable part of said wall, to move said part out of braking position when the cover is moved to opening position, and mutually engaging means on said cover and said movable part of said wall, to hold said part of said wall in various braking positions to which it may be moved.

15. A mixing machine comprising a bowl having front and side walls and a lower rear wall, a cover for said bowl, forwardly from under which the bowl is tiltable and which makes closing contact with said front and side walls when said bowl is under said cover, but which terminates forwardly from a vertical plane through the top of said rear wall, and elements pivoted together forwardly from said top of said wall, one of said elements extending up from its pivot to the rear termination of said cover and being movably connected to said cover, the other element extending back to said top of said rear wall, and a mounting for said other element permitting withdrawal of said elements rearwardly over said top of said wall, for the purposes set forth.

16. A mixing machine as set forth in claim 15, in which the movable connection of the upwardly extending element with the cover is detachable to permit movement of the elements upwardly without moving them rearwardly over the top of the rear wall, for the purposes set forth.

17. A mixing machine comprising a bowl having front and side walls and a lower rear wall, a cover for said bowl, forwardly from under which the bowl is tiltable and which makes closing contact with said front and side walls when said bowl is under said cover, but which terminates forwardly from a vertical plane through the top of said rear wall, and elements pivoted together forwardly from said top of said wall, one element extending up from its pivot to the rear termination of said cover and being movably connected to said cover, and the other element extending back to said top of said rear wall, and a mounting for said other element permitting movement of the elements upwardly, for the purposes set forth.

18. A mixing machine as set forth in claim 15, in which the mounting for the backwardly extending element comprises a crank device operatively connected to the rear part of the cover to move the cover rearwardly and open the forward part of the bowl when said elements are withdrawn over the rear wall, for the purposes set forth.

19. A mixing machine comprising a bowl, a support for the bowl on which the bowl is tiltable forwardly from mixing position, an agitator in the bowl, a cover with which the front and side walls make a closing contact when the bowl is in mixing position under the cover, while the rear wall and cover are spaced apart, and an articulated structure movably mounted on the cover and the support, completing closure of the bowl at the rear when the bowl is in mixing position, and operatable to extend into braking relation with the agitator or to be withdrawn over the bowl rear wall, while the bowl is in mixing position for the purposes set forth.

20. A mixing machine comprising a bowl, a support for the bowl on which the bowl is tiltable forwardly, an agitator in the bowl, a cover with which the front and side walls make a closing contact when the bowl is under the cover, while the rear wall and cover are spaced apart, and an articulated structure movably mounted on the cover and the support, completing closure of the bowl at the rear, and operatable to extend into braking relation with the agitator or to be withdrawn over the bowl rear wall, for the purposes set forth, said articulated structure having its mounting on the cover releasable, for adjustment of the structure toward and from the agitator without withdrawal over said rear wall.

EDWARD J. LAUTERBUR.